United States Patent [19]

Mifune et al.

[11] Patent Number: 5,129,058
[45] Date of Patent: Jul. 7, 1992

[54] PARALLEL OPTICAL IMAGE PROCESSING SYSTEM

[75] Inventors: Hironobu Mifune; Toshio Inada, both of Yokohama, Japan

[73] Assignee: Ricoh Company, Ltd., Japan

[21] Appl. No.: 374,296

[22] Filed: Jun. 30, 1989

[30] Foreign Application Priority Data

Jul. 6, 1988 [JP] Japan .................. 63-168327
Jul. 6, 1988 [JP] Japan .................. 63-168328
Jul. 6, 1988 [JP] Japan .................. 63-168330

[51] Int. Cl.$^5$ ............................................ G06F 15/20
[52] U.S. Cl. .................. 395/162; 364/232.93; 340/747
[58] Field of Search ........... 364/518, 521, 522, 232.93, 364/936.1, 713; 340/747, 750; 382/22, 25; 395/162

[56] References Cited

U.S. PATENT DOCUMENTS

| | | | |
|---|---|---|---|
| 4,623,935 | 11/1986 | Mukai et al. | 358/280 |
| 4,962,539 | 10/1990 | Takeo et al. | 382/9 |
| 4,969,202 | 11/1990 | Groezinger | 382/22 |
| 4,974,261 | 11/1990 | Nakahara et al. | 382/22 |

Primary Examiner—Gary V. Harkcom
Assistant Examiner—Phu K. Nguyen
Attorney, Agent, or Firm—Mason, Fenwick & Lawrence

[57] ABSTRACT

A parallel optical image processing system comprises a image detection part for detecting an input image, an encoding part supplied with an electrical image signal from the image detection part for producing an encoded input image in a form of optical beam, an optical memory stored with a number of images in a form of encoded image, an optical interconnection part supplied with the encoded input image for addressing the optical memory by deflecting the optical beam so as to read out one of the images stored in the optical memory as an associated image, a first optical path supplied with the encoded input image, a second optical path supplied with the associated image, a decoding part supplied with the encoded input image and the associated image from said first and second optical paths as an encoded output image for decoding the encoded output image thus supplied to form a decoded output image, and feedback control part for controlling the addressing of the memory by the optical interconnection part responsive to the encoded output image.

15 Claims, 12 Drawing Sheets

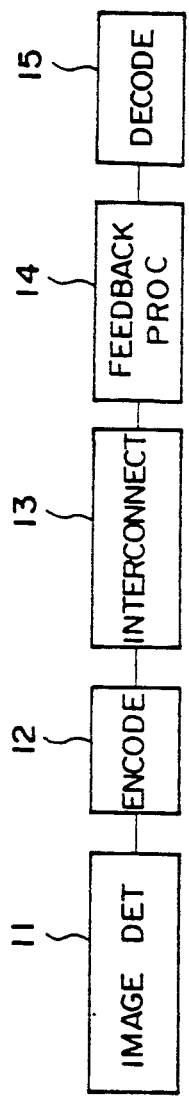
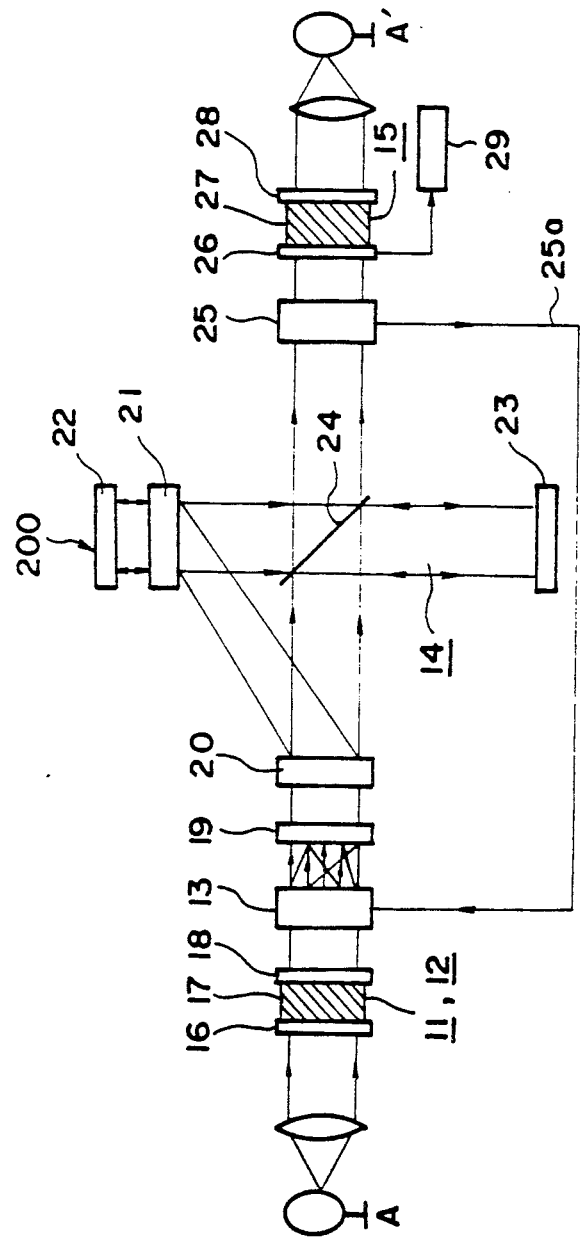

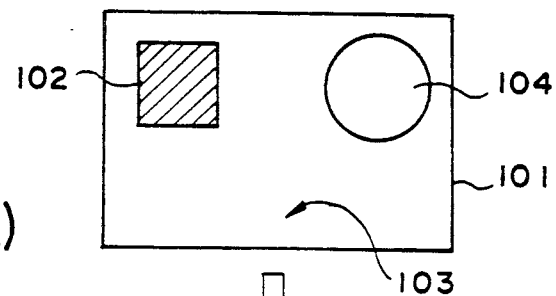
FIG. 4(A)
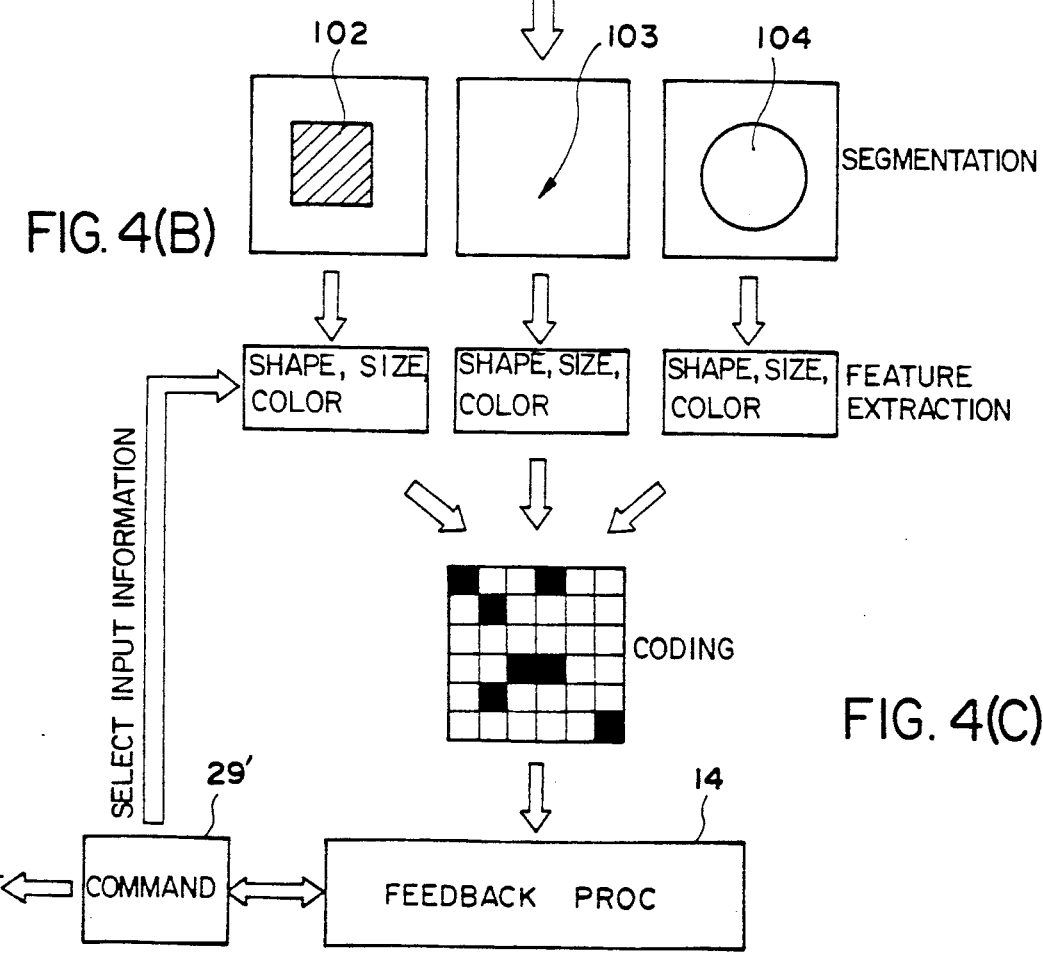
FIG. 4(B)
FIG. 4(C)

PARALLEL OPTICAL IMAGE PROCESSING SYSTEM

BACKGROUND OF THE INVENTION

The present invention generally relates to image processings and more particularly to a parallel optical image processing system having an associative memory function.

Conventionally, application of parallel optical image processing is studied in various filterings and correlation evaluations. This technique is based on the analog Fourier transform using a single lens and has an extremely high processing speed. On the other hand, it has a problem in the accuracy and reliability because of the limitation pertinent to the nature of analog processing. Thus, at the moment, image processing is performed mainly on the basis of digital processing using digital computer which is easy to be programmed and can perform various processing functions. However, the digital processing is a time sequential procedure and needs substantial processing time as well as substantial memory space when applied to the processing of images.

On the other hand, there is a proposal to combine digital computer and optical processing as is disclosed in the Japanese Laid-open Patent Application No.61-179424. In this system, an optical logic operation is performed by using a two dimensional optical memory array and an optical interconnection array confronting the optical memory array. The optical interconnection array changes the optical path of the optical beam incident thereto and the system performs logical operation such as addition, subtraction, multiplication or division of the input image information. This system, however, has no associative memory function.

Further, there is proposed an optical parallel image processing system having an associative memory function in which a complete image is obtained on the basis of an incomplete input image. For example, there is described a feedback optical processing system using a hologram memory and a threshold device for obtaining a complete image on the basis of incomplete input image (Abu-Mostafa et al. "Optical Neural Computers", Scientific American Vol.256, Number 3, pp.66–73, 1987).

Further, there is an optical parallel image processing system as disclosed in the Japanese Laid-open Patent Application No.62-106590 or No.58-22147 in which pattern recognition or segmentation of a number of patterns is performed by a neural network model. This conventional system allows parallel displacement of input image and has a capability of operating as an associative memory. However, the system has a problem in that it has to have an optical system which is constructed with extreme precision because of the reason that the system handles fully analog images. In other words, such a system is fragile and the recalled image tends to be deteriorated. Further, the system has a problem in that further processing of the obtained image by digital computer is difficult.

Meanwhile, various optical devices are proposed in the field of optical telecommunications for modulation and deflection of optical beams. Such optical devices have no moving parts and performs the polarization of light beam or deflection of the light beam. Some of such devices are already in use in the apparatus such as optical printers for modulating the intensity of the beam. Further, logic devices using such an optical device is also proposed. However, there is no optical device which performs such modulation and deflection of the optical beam and at the same time designed in a form convenient for application to the optical image processing system having associative memory function. In a typical example disclosed in the Japanese Laid-open Patent Application No.63-26636, the optical device is constructed in a form of wave guide in which one of the output beams has a strong optical power when a control signal is supplied while the other of the output beams has the strong optical power when the control signal is not supplied. Obviously, such a device having the wave guide structure is difficult to construct in a form of two-dimensional matrix which is suited for the parallel optical processing system.

In summary, there is no known parallel optical image processing system for performing an associative memory function wherein the system has a flexibility in the optical interconnection between the optical elements in the system in addition to the ability of the optical parallel processing.

SUMMARY OF THE INVENTION

Accordingly, it is a general object of the present invention to provide a novel and useful parallel optical processing system wherein the aforementioned problems are eliminated.

Another and more specific object of the present invention is to provide a parallel optical image processing system comprising an image receiving part supplied for detecting an input image, an encoding part for producing an encoded coherent output beam responsive to said image received by the image receiving part, an interconnection part supplied with the encoded coherent optical beam for deflecting the beam in a desired direction, a processing part including optical memory means on which said coherent encoded optical beam is directed, for reading out an encoded image associated with the input image from the optical memory means, threshold means for selecting an encoded associated image which has a predetermined correlation with the input image, feedback means for feeding back the associated image to said interconnection part for changing the deflection of the coherent encoded optical beam, and a decoding part for decoding the associated image. According to the present invention, advanced image processing such as association of image, adaptation to frequently used images or oblivision of unnecessary image can be achieved. Further, as a result of the use of the interconnection part which performs three dimensional interconnection of the optical path of the coherent optical beams, crosstalk between the signals carried by the beams is eliminated. Furthermore, accuracy and reliability of the optical processing is improved as a result of use of the pre-processing part.

Another object of the present invention is to provide a method of encoding an input image according to a basic feature of an object in the input image before it is fed to a parallel optical image processing system. According to the present invention, requirement for precision of the optical image processing system becomes less stringent and the optical processing performed by the system becomes less sensitive to the disturbances applied to the system.

Another object of the present invention is to provide an optical information processing device, comprising a electro-optic modulator for modulating state of polarization of transmitting light responsive to a voltage applied thereto, an acousto-optic deflector coupled to an ultrasonic transducer for deflecting an output optical beam of said electro-optic device responsive to an oscillation frequency of the ultrasonic transducer, first memory means for storing the voltage applied to said electro-optic modulator, and second memory means for storing the oscillation frequency of the ultrasonic transducer. According to the present invention, the intensity of light and direction of deflection is controlled according to the voltage or the oscillation frequency stored in the first and second memory means easily and with reliability. Further, such a system is easily constructed in a form of two-dimensional array suited for use in the parallel optical image processing system.

Still other objects and further features of the present invention will become apparent from the following detailed description when read in conjunction with attached drawings.

BRIEF DESCRIPTION OF THE DRAWINGS

FIG.1 is a block diagram showing a general construction of the parallel optical image processing system of the present invention;

FIG.2 is a block diagram showing a first embodiment of the parallel optical image processing system of the present invention;

FIG.4 is the diagram showing a procedure for encoding an input image used in the system of FIG.2;

DETAILED DESCRIPTION

Figure 3:
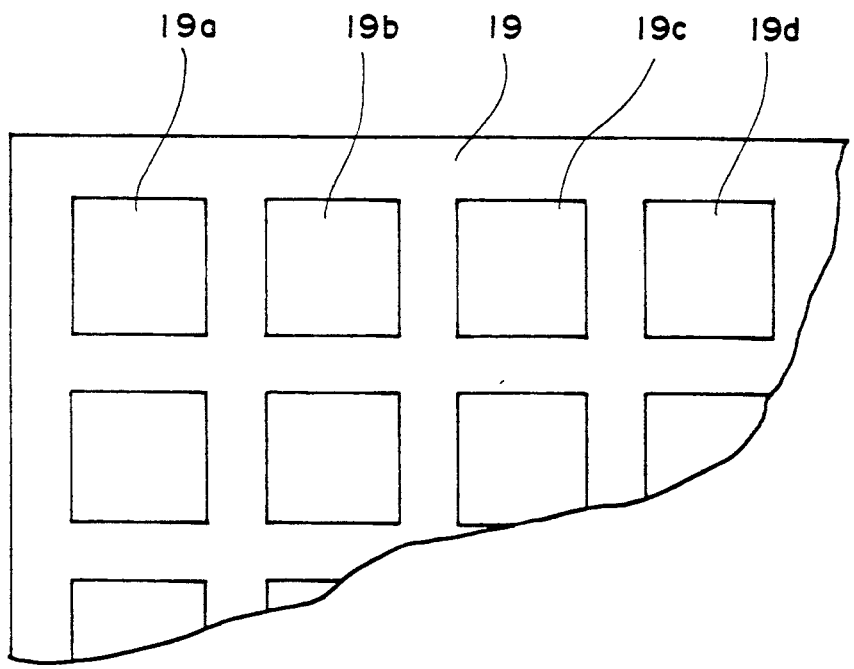
FIG.3 is a diagram showing a part of an optical memory used in the system of FIG.2.

Hereinafter, a first embodiment of the system of the present invention will be described with reference to FIGS.1 and 2. The parallel optical image processing system of this embodiment performs image processing such as recognition of object, extraction of selected information from the recognized image, association of image with the selected information, decision on the basis of comparison with the input image, and the like.

FIG.1 shows the general construction of the system of the present embodiment schematically in a form of block diagram. Referring to FIG.1, the system comprises an image receiving part 11 for receiving an image of an object, an encoding part 12 supplied with the image of the object for producing a coded input image in a form of coherent optical beam, an interconnection part 13 for interconnecting the optical path of the coherent optical beam from the encoding part 12, a feedback processing part 14 for performing association of image in a recursive manner based on the coded input image so as to select an associated image which has a close correlation with the coded input image from a number of stored images, and a decoding part 15 for decoding the selected image.

FIG.2 shows a more detailed construction. Referring to the drawing, an input image A is received by a photodetector array 16 and is encoded by an electronic encoder 17. In this encoding procedure, the image is binarized and edge extraction is performed. As a result of the encoding, a value indicating the feature of the image such as the size of object, color etc. is obtained. Such an encoding corresponds to the perception in the case of biological body. Thereafter, a coded image thus obtained is outputted by a laser diode array 18. In this laser diode array 18, each of the laser diodes in the array produces an optical output in correspondence to the code. Thus, the photodetector array 16, electronic encoder 17 and the laser diode array 18 constitutes the image receiving part 11 and the encoding part 12.

Next, selection is made on what feature of the image that the association of image should be performed, by an interconnection device 13. For example, when association should be made for a body having a round shape and a large size, the interconnection device 13 deflects the optical beam passing therethrough so that the beam addresses a particular part of an optical memory 19 as will be described. In the interconnection device 13 of the actual system, the coded image outputted from the laser diode array 18 is divided into a plurality of blocks arranged in a row and column formation. In each block, the coded image is passed through a lens system (not shown) before passing through the interconnection device 13 and is focused on the memory 19 in a form of an optical beam.

The memory 19 comprises a mask having a number of windows 19a, 19b, . . . arranged in a row and column formation as shown in FIG.3 wherein each of the windows carries a pattern of dots in correspondence to particular feature of the coded image. Thus, responsive to irradiation of the optical beam directed by the interconnection device 13, a coded image associated with the input coded image on the basis of the selected feature is read out from the memory 19. As will be described later, the interconnection device 13 uses Bragg reflection for deflection of the optical beam and thus there is simultaneously formed a straight path of the coded input image which does not experience deflection. Such a coded input image is passed straight through a transparent window in the memory 19 without modification.

Then, an associated image is read out from the memory 19 in a form of coded image and is supplied to a spatial modulator 20 carrying a diffraction grating together with the coded input image. Thereby, the associated image is passed through the spatial modulator 20 straight as a zeroth order diffraction beam, while the coded input image is diffracted upwards towards a spatial modulator 21 disposed in a phase conjugate mirror system 200 comprising a mirror 22 and a mirror 23. The phase conjugate mirror system 200 compensates the distortion of wavefront of the optical beam. The spatial modulator 21 changes the effective length of a resonator formed by the mirrors 22 and 23 in the phase conjugate mirror system 200.

The associated image read out from the memory 19 is directed to a threshold device 25 via the spatial modulator 20 and a semi-transparent mirror 24. In this state, the spatial modulator 20 passes the associated image straight therethrough as already described. Further, the mirror 24 directs the coded input image established in the phase conjugate mirror 200 to the threshold device 25.

The threshold device 25 is a device having a differential characteristic and passes the input image only when the image has an intensity exceeding a predetermined threshold. Thus, the threshold device 25 detects whether the agreement between the coded input image and the associated image incident thereto in a form of coded image has exceeded a predetermined threshold level, and if yes, the received image is passed to a photodetector array 26 which has a similar construction as the photodetector array 16. This photodetector array 26 is followed by an electronic decoder 17 for decoding, and a laser diode array 28 which is similar to the laser diode array 18 is driven responsive to an output signal of the decoder 17. Thus, an image A' which is associated by the system on the basis of the input image A is obtained. Alternatively, one may supply the image directly from the photodetector array 26 to a subsequent processing part 29.

When, on the other hand, the degree of agreement has not exceeded the predetermined threshold level, the threshold device 25 produces an output signal to the interconnection device 13 via a feedback path 25a, and the interconnection device 13 changes the angle of deflection responsive thereto. As a result, a new associated image is read out from the memory 19 and the agreement between the newly read out associated image and the input coded image is examined again in the threshold device 25 until there is obtained a satisfactory agreement.

Thus, the feedback processing part of FIG.1 comprises the memory 19, the spatial modulator 20, the phase conjugate mirror 200 and the threshold device 25, while the decoding part comprises the photodetector array 26, the decoder 27 and the laser diode array 28.

Such a parallel optical processing system performs following functions.

a) Recovering of complete image from an incomplete input image

This function obtains a full image when an input image is given to the system in a state that some part of the input image is missing.

b) Recognition of the input pattern

Given an input image, the system identifies what it is from a number of images stored in the system.

c) Adaptation of memory to frequently used images and less frequently used images When a same input image is given many times, the system adapts the processing for responding to such an image while diminishing ability of responding to less frequently given image or totally losing ability to respond such image.

d) Associative memory

Responsive to an input image, the system read out an image which is different from the input image but is associated most strongly by the image.

In realizing the processor having such functions, the ability of learning is essential. In the system of the present invention, this ability of learning is given by the interconnection device 13 which utilizes the flexibility in the optical connection or optical "wiring". Thus, the interconnection device 13 branches the light beam carrying the two-dimensional coded input image to a desired direction and the learning is made to determine the direction and strength of the deflected optical beam.

Thus, the parallel optical processing system of the present invention realizes the visual information processing function in addition to the large capacity and high speed optical processing by using the interconnection of the optical beam. Further, such a three dimensional "wiring" of the optical beam reduces the interference between the signals and special measure for reducing the crosstalk between the signals can be eliminated. In relation with this, the system can be constructed compactly.

It should be noted that the present system is not a fully analog system but processes the input image by once converting it to the code. Thus, the system becomes more immune to the perturbations or noise in the system and the result obtained by the system becomes more reliable.

FIGS.4(A)–(C) show an example of coding performed in the encoder 17. Referring to FIG.4(A), a two-dimensional input image 101 comprising a grey square 102, a small black triangle 103 and an open circle 104 is received by the photodetector array 16. Next, the input image 101 is subjected to segmentation and feature extraction whereby the input image 101 is decomposed into the square 102, triangle 103 and the circle 104. In the feature extraction, the size, shape and color for the objects 102, 103 and 104 in the input image 101 are checked. Such a feature extraction is made by edge detection, slope detection, curvature detection, and line connection pattern detection which may be performed optically or electronically.

FIG.4(C) shows an example of the coded input image outputted from the laser diode array 18. This coded input image is supplied to the feedback processing part 1 already described. It should be noted that the pattern shown in FIG.4(C) carries the information about the shape, size and color of the objects 102, 103 and 104. The result of the feedback processing part 14 is detected by the photodetector array 26 and is supplied to a command part 29' which may be a part of subsequent processing part 29. The part 29' further selects the input information depending on the needs.

Figure 5:
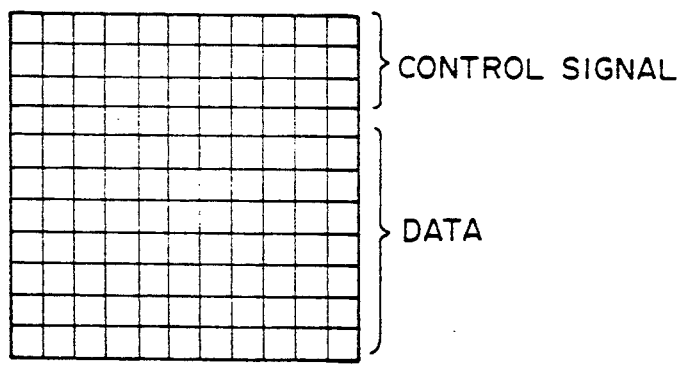
FIG.5 is a diagram showing a structure of coded image obtained in the procedure of FIGS.4.

FIG. 5 shows the construction of the coded input image. Referring to FIG. 4, the coded input image has a two-dimensional matrix structure in which there are defined a control signal part indicating the order of the object in the image 101 as well as the shape, size and color for each of the objects in the image. Further, there is defined a data part indicating the arrangement of data. Of course, more detailed information can be handled by increasing the magnitude of the matrix. It should be noted, however, that a too large matrix is undesirable because of the increased processing load in the feedback processing part 14. As already described, the system becomes more immune to the noise when the input image is coded as such and the tolerance in constructing the system is greatly improved.

Next, a more detailed description will be given for the segmentation and feature extraction of the input image 101 with reference to FIG. 6.

Figure 6:
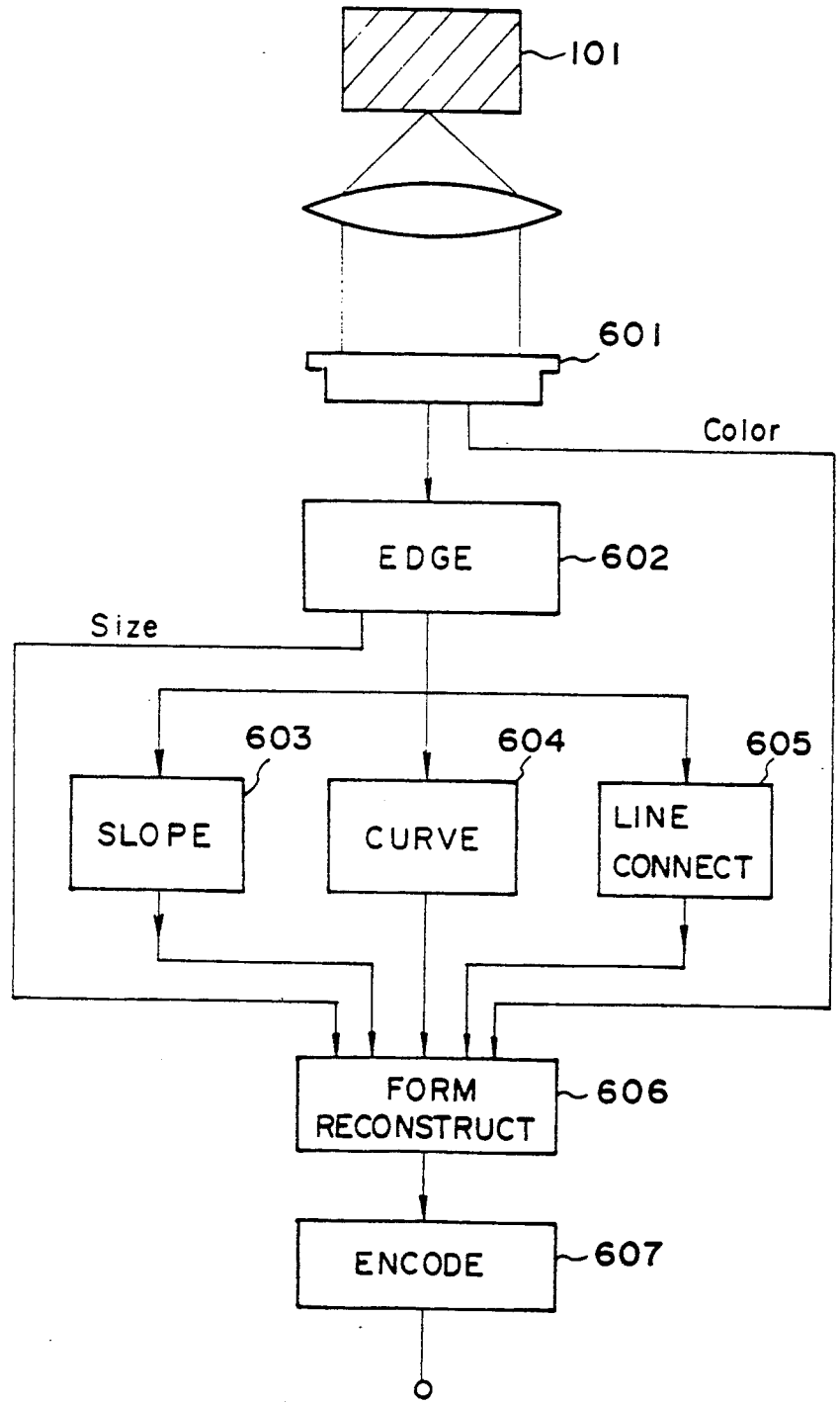
FIG.6 is a block diagram showing a hardware construction for performing the encoding procedure of FIG.4.

Referring to FIG. 6, the input image 101 is received by a photodetector array 601 corresponding to the photodetector array 16 of FIG. 2. The photodetector array 601 produces an output signal which is supplied to an edge detection part 602. The edge detection part 602 detects the edge of the input image as an edge image by a spatial differentiation of the image. The edge image is then supplied to a slope detecting part 603, a curvature detecting part 604 and a line connection pattern detecting part 605 simultaneously. The parts 603, 604 and 605 may be a mask for selectively passing a line having a predetermined slope, curvature and line connection pattern and may be constructed optically or electronically. Example of the edge detection part 602 or the slope detection part is described in a co-pending United States Patent Application entitled "PARALLEL IMAGE PROCESSING SYSTEM" filed on Jun. 14, 1989 in which the assignee is identical to that of the present invention.

Output signals from the slope detecting part 603, curvature detecting part 604 and the line connection part 605 are supplied to a basic form reconstruction part 606 together with a color signal indicating the color of the object from the photodetector array 601 as well as a size signal indicating the size of the object from the edge detection part 602. In the form reconstruction part 606, these output signals are arranged in a predetermined format and on the basis of this format, the coded input image is produced in a encoding circuit 607. Thus, the edge detection part 602, slope detection 603, curvature detection part 604, line connection part 605, form reconstruction part 606 and an encoding circuit 607 constitutes the encoder 17 of FIG. 2. The output of the encoding part 607 is supplied to the laser diode array 18 and the encoded image as shown in FIG. 4(C) is produced.

Next, description will be given for the interconnection device 13 with reference to FIGS. 7–12. The device 13 used in the system of FIG. 2 utilizes the electro-optic effect and acousto-optic effect so a to change the intensity and direction of the output light exiting therefrom.

First, the principle of the Pockels effect which is a first order electro-optic effect will be explained with reference to FIG. 7. In this example, an electro-optic crystal 701 which may be a cubic crystal of bismuth silicon oxide $Bi_{12}SiO_{20}$ referred to hereinafter as BSO, is used. When an electrical voltage is applied across a pair of opposing surfaces of the crystal 701 by a d.c. voltage source 702, a birefringence is induced in the crystal 701. More specifically, a polarized light F assumes a velocity in the BSO crystal 701 which is faster than another polarized light S which is perpendicular to the polarized light F. When another linearly polarized light $I_i$ having a polarization which bisects the angle between the polarization of the light F and the polarization of the light S, is incident to the crystal 701 which in turn is biased to the state having the birefringence, an elliptically polarized light is obtained as an output light. When such an elliptically polarized light is incident to an analyzer having a polarization which is perpendicular to that of the input light $I_i$, an output beam having an intensity represented as $$I = I_i \sin^2 KV$$

where $K = (\pi/2) \cdot V\pi$, $V\pi$ is a half wavelength is obtained. Thus, by changing the voltage V applied by the d.c. voltage source 702, the intensity of the light after passing through the analyzer 703 can be changed.

Figure 8:
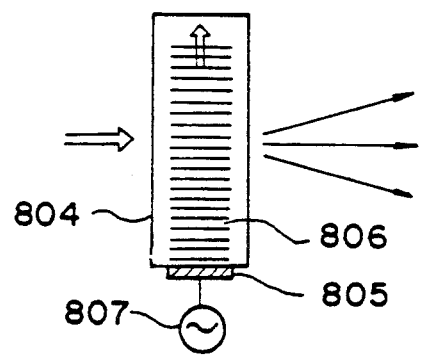
FIG.8 and FIG.9 are diagrams for explaining the acousto-optic effect.
Figure 9:
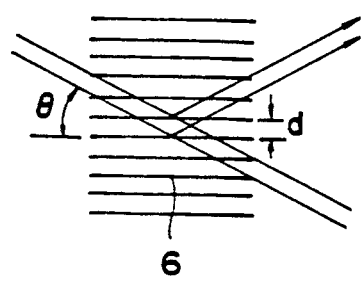

FIG. 8 shows the acousto-optic effect. When an acousto-optic material 804 such as lithium niobate $LiNbO_3$ is applied with a longitudinal elastic wave by an ultrasonic transducer 805 driven by an oscillator 807, there is established a periodical modulation of density 806 in the material 804. Such a periodical distribution of density diffracts the light incident to the material 804 when there is satisfied a Bragg's condition $2d \cdot \sin\theta = n\lambda$, where d stands for the period of the wave, $\lambda$ stands for the wavelength of the light, $\theta$ stands for the angle of incidence and n is a positive integer.

By changing the oscillation wavelength of the oscillator 807, one can change the period d and hence the angle of diffraction. In other words, one can deflect the light incident to the material 804 by changing the oscillation wavelength of the oscillator 807. Alternatively, one may obtain a similar effect by using a surface acoustic wave (SAW) device.

Figure 7:
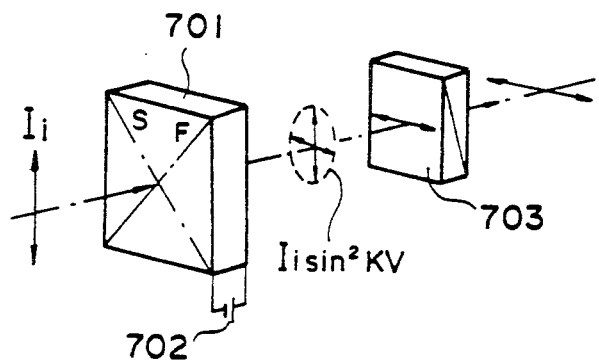
FIG.7 is a diagram for explaining the electro-optic effect.
Figure 10:
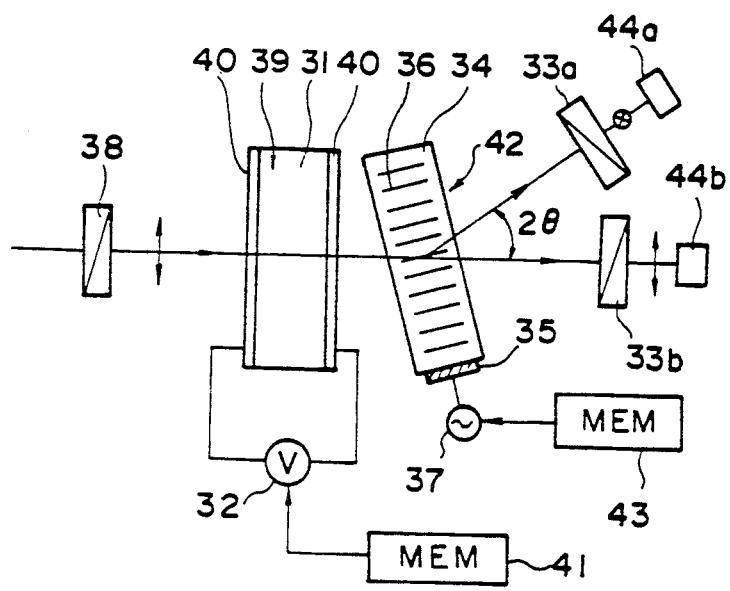
FIG.10 is a diagram showing a principle of an interconnection device used in the system of FIG.2.

FIG. 10 shows an embodiment of the interconnection device 13 using the electro-optic device and the acousto-optic device shown in FIGS. 7 and 8. Referring to FIG. 10, the device 13 includes an electro-optic device 39 comprising a BSO crystal 31 carrying a pair of transparent electrodes 40 on both sides of the crystal 31. Further, a voltage source 32 connected across the electrodes 40 and applies a d.c. voltage under control of a memory 41. Responsive thereto, optical beam incident to the BSO crystal 31 is modulated in accordance to the applied voltage and an elliptically polarized optical beam is produced as already described as an output beam. This output beam is then incident to an acousto-optic device 42 comprising a $LiNbO_3$ crystal 34 to which an ultrasonic vibration is applied via a transducer 35. The transducer 35 is driven by an oscillator 37 of which oscillation wavelength is controlled by a memory 43. As a result, there is formed a periodic modulation of density 36 which acts as a diffraction grating and the incident optical beam is on the one hand passed straight through the crystal 34 and on the other hand diffracted by the grating 36. It should be noted that the angle of deflection $2\theta$ is changed by changing the oscillation frequency of the oscillator 37. The optical beam passed straight through the crystal 34 as well as the optical beam diffracted in the crystal 34 are respectively passed through analyzers 33b and 33a behind which are disposed photodetectors 44b and 44a. By controlling the voltage applied to the BSO crystal 31 by the voltage source 32, one can change the intensity of the optical beam detected by the photodetectors 44a and 44b.

Figure 11:
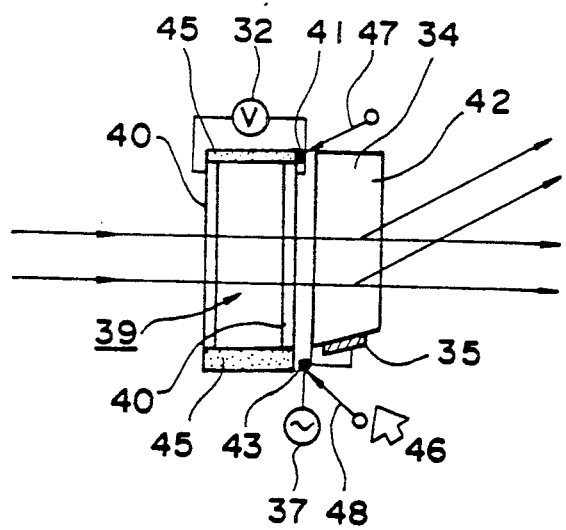
FIG.11 is a diagram showing the interconnection device of FIG.10 in a more practical form suitable for use in the system of FIG.2.

FIG.11 shows another embodiment of the device 13 which is assembled in a form suitable for use in the system of FIG.2. In this device, the BSO crystal 31 of the electro-optic device 39 is surrounded with an insulator layer 45 and the memory 41 for controlling the voltage applied across the electrodes 40 is accessed via a line 41. In other words, the content of the memory 41 specifying the voltage across the electrodes 40 is updated via the line 41. Similarly, the content of the memory 43 can be updated through a line 48. Thus, one can change the oscillation frequency of the oscillator 37 and hence the deflection angle $2\theta$ of the optical beam. In this embodiment, the BSO crystal 31 and the LiNbO$_3$ crystal 34 are held unitarily with a small separation which is set sufficient to eliminate interaction.

Figure 12:
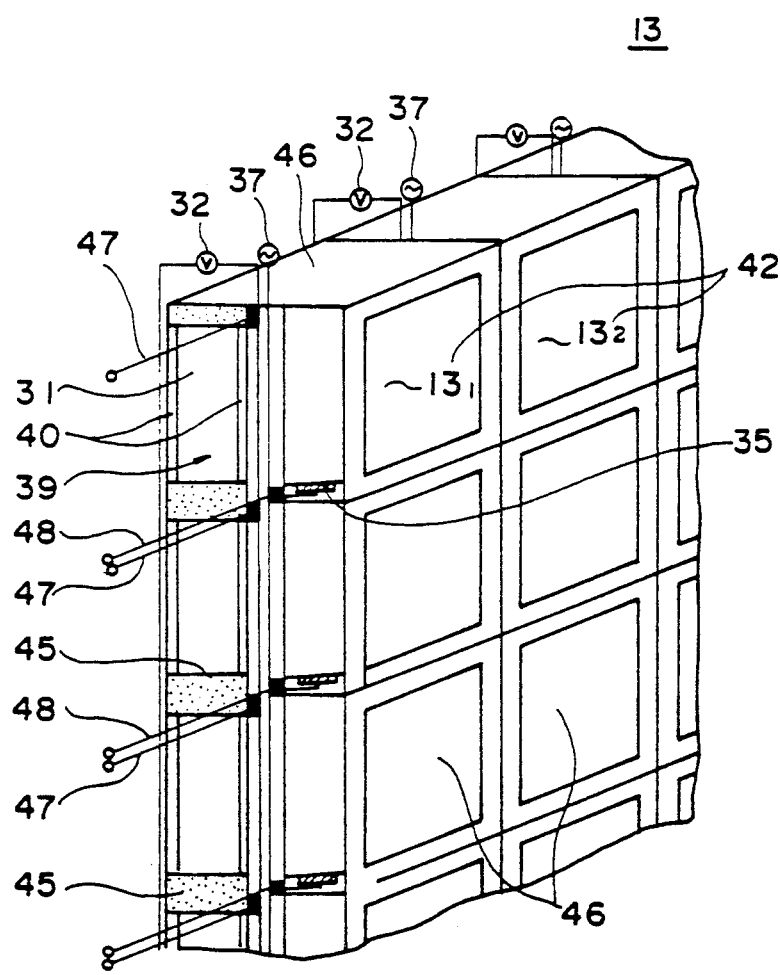
FIG.12 is a diagram showing the interconnection device arranged in a two-dimensional array.

Next, a third embodiment of the interconnection device 13 of the present invention will be described with reference to FIG.12. In this embodiment, the device of FIG.11 is arranged in a row and column formation as element devices $13_1$, $13_2$, ... so as to process a two-dimensional image signal. In the drawing, these parts constructed identically to those corresponding parts in the FIGS.10 and 11 are given identical reference numerals and the description thereof will be omitted. In the device of FIG.12, each element device $13_1$, $13_2$, ... of the devices 13 is controlled responsive to the control signals supplied to the lines 47 and 48 from the threshold device 25 which is supplied via the feedback path 25a. As each of the devices are independent, one can control the deflection of the optical beam passing through the element devices $13_1$, $13_2$, ....

Next, a fourth embodiment of the interconnection device will be described with reference to FIGS.13–16. In the drawings, these parts constructed identically to those corresponding parts in the preceding drawings are given identical reference numerals and the description thereof will be omitted.

Figure 13:
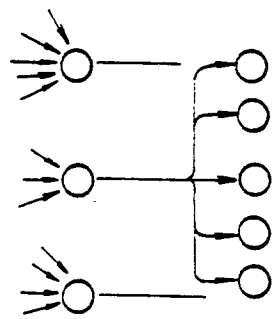
FIG.13 is a diagram showing a general structure of neural network of a biological body.

This embodiment simulates the nerve system of biological body. Referring to FIG.13 showing a typical construction of the nerve system, the nerve system comprises a number of neurons represented by open circles in which one neuron receives input signals from a plurality of neurons in a previous processing stage and produces an output signal by summarizing the input signals. The output signal thus produced is supplied to the neuron in the following processing stage.

Figure 14:
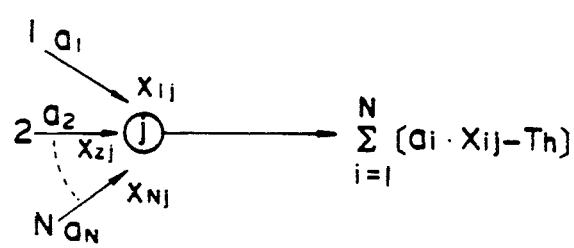
FIG.14 is a diagram showing a principle of operation of the neural network of FIG.13.

The way to produce the output signal in a neuron j receiving an output signal from a number of preceding neurons i as in the situation of FIG.14 is described as follows.

The input signal to the neuron j from a neuron i having an output signal level $a_i$ is represented as $a_i \cdot X_{ij}$ where $X_{ij}$ stands for the strength of coupling between the neuron i and the neuron j. Such a connection is called a synaptic coupling. Assuming that the neuron j is supplied with output from preceding neurons 1 - N, the overall input signal to the neuron j is represented as $$\sum_{i=1}^{N} a_i \cdot X_{ij}. \tag{1}$$

When the neuron j has a threshold of Th, the neuron j produces an output signal $$\sum_{i=1}^{N} [a_i \cdot S_{ij} - Th]. \tag{2}$$

The output signal thus obtained is further multiplied with the coupling strength and is supplied to a following neuron.

Figure 15:
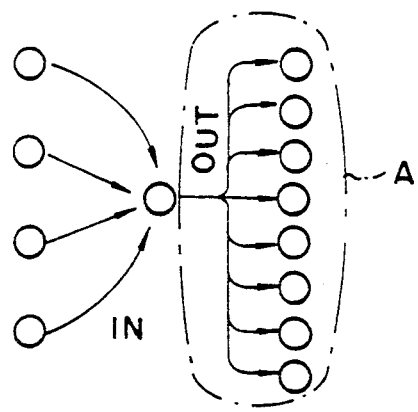
FIG.15 is a diagram showing a neural network to be simulated by an interconnection device having a basic construction shown in FIG.11.
Figure 16:
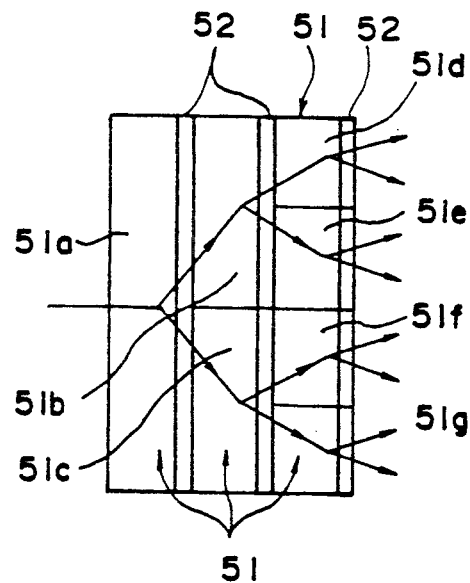
FIG.16 is a diagram showing an interconnection device for simulating the neural network of FIG.15.

The present embodiment simulates the function of such nerve system particularly for a part enclosed by a broken line A in FIG.15. FIG.16 shows the interconnection device of the present embodiment. In this device, interconnection devices 51 shown in FIG.11 is stacked in three layers with polarizers 52 interposed between the layers as well as on an output surface of the stacked structure so as to produce a plurality of output optical beams responsive to one input optical beam. As the number of layers is three in this embodiment, eight ($=2^3$) optical output beams can be produced responsive to one input optical beam. More specifically, the first layer in the input side comprises a single sub-device 51a while the second layer comprises two sub-devices 51b and 51c in correspondence to a splitted optical path of the beam. Further, the third layer at the output side comprises four sub-devices 51d–51g. In each of the sub-devices, the intensity and deflection of the optical beam can be controlled independently. This corresponds to the adjustment of the coupling strength in the synaptic coupling.

By arranging such a three or multi-layerd device in a row and column formation and by combining the plurality of output signals on a threshold device, one can obtain a device performing the operation of Eq.(2). In other words, a neural network is simulated by an optical device. Further, the stacked structure as shown in FIG.16 enables a large deflection angle even when each of the sub-devices can provide only a limited deflection angle.

Figure 17:
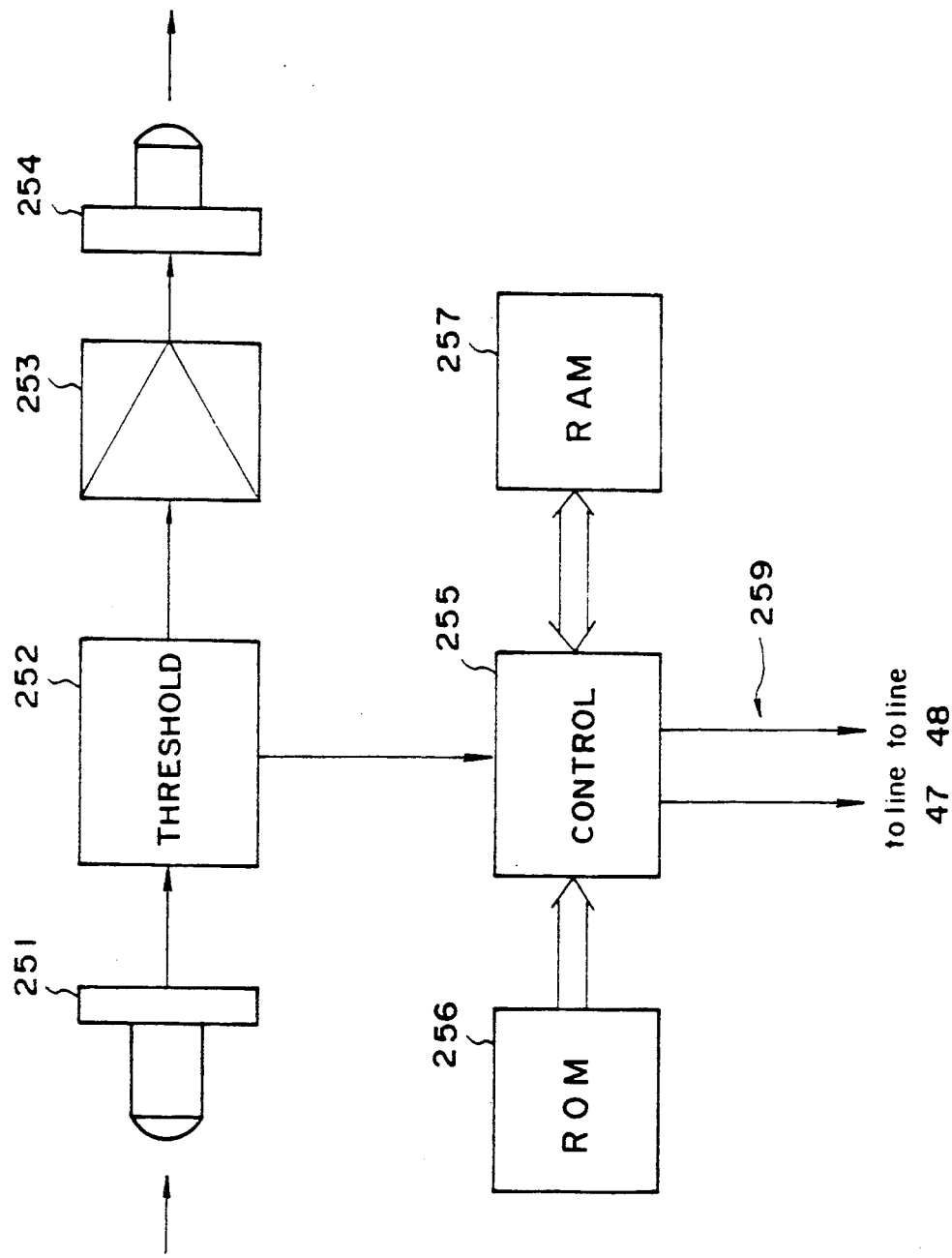
FIG.17 is a block diagram showing a construction of a threshold device used in the system of FIG.2.

FIG.17 shows a construction of the threshold device 25. In correspondence to the nature of two-dimensional image, the device 25 is constructed in a form of array. In FIG.17, however, only one of the elements of the array is shown for the sake of simplicity.

Referring to FIG.17, the input optical beam is received by a photodetector 251 and an output signal produced responsive thereto is supplied to a threshold discriminating circuit 252. The circuit 252 compares the level of the output signal with a predetermined threshold level and when the level of the output signal has exceeded the threshold level, supplies the output signal to a laser diode 254 via a driving circuit 253. Thus, an output optical beam is sent to the photodetector array 26. When the level of the output signal of the photodetector 251 is smaller than the predetermined threshold, the circuit 252 disables the output to the laser diode 254 and produces an output signal to a controller 255. The controller 255 cooperates with a read-only memory (ROM) 256 which stores a sequence of how to deflect and change the intensity of the optical beam in the interconnection device in a form of table containing intensity and deflection angle. This sequence is determined empirically such that the operation of the system converges rapidly. Thus, the controller 255 reads out the content of the table and produces control signals to be supplied to a line 47 and a line 48 of FIGS.11 or 12 via the feedback path 25a. Further, the number of times such feedback operation is performed is stored in a random access memory (RAM) 257. It is also possible to store the table in the RAM 257 instead of storing in the ROM 256 and updating the content of the RAM 257 by the value of the control signals frequently used in the system. By doing so, one can provide an ability of learning to the system.

Figure 18:
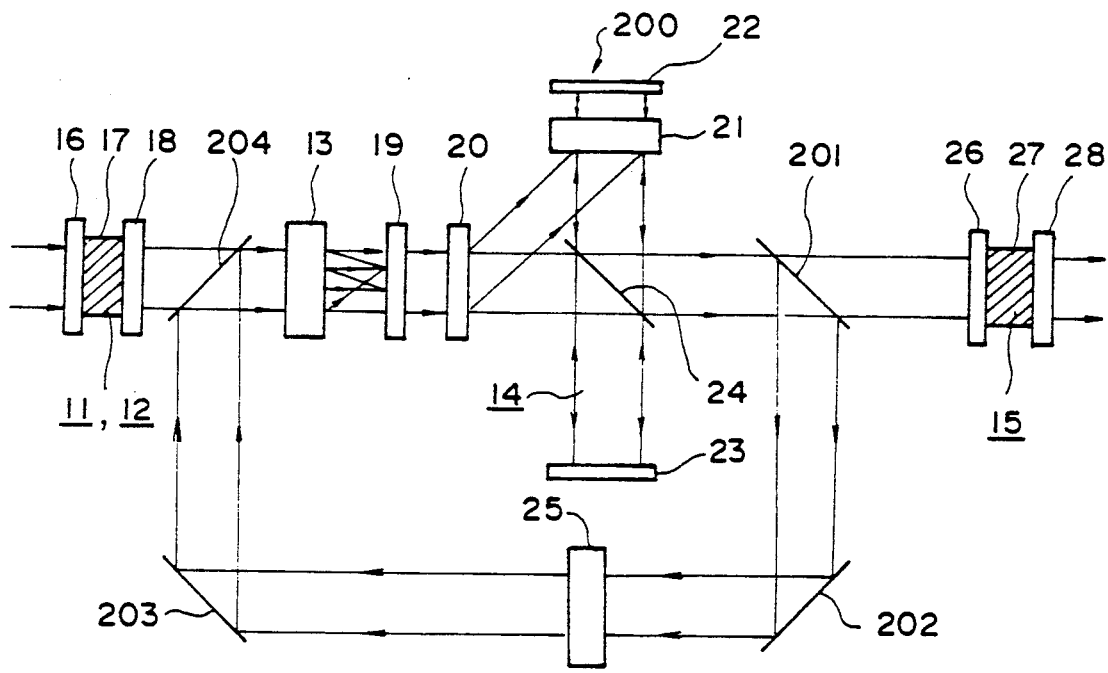
FIG.18 is a block diagram showing a second embodiment of the parallel optical processing system of the present invention.

FIG.18 shows a second embodiment of the parallel optical processing system of the present invention. In the drawing, these parts constructed identically to those corresponding parts in the preceding drawings are given identical reference numerals and the description thereof will be omitted.

In this embodiment, the feedback system is constructed by a mirror system comprising mirrors 201, 202, 203 and 204 and the threshold device 25 is provided in this mirror system. As the threshold device produces a two-dimensional output image which changes responsive to the input image incident thereto, the image returned to the threshold device 25 through the interconnection device 13, memory 19, spatial modulator 20 and the phase conjugate mirror changes each time as long as there is a interconnection of the optical path between the interconnection device 13 and the memory 19 even when the state of the interconnection device 13 is stationary. When the coded image thus passed through the feedback path has converged, the image is detected by the photodetector array 16 and is converted back to normal image by the decoder 27 and the outputted by the laser diode array 28.

Figure 19:
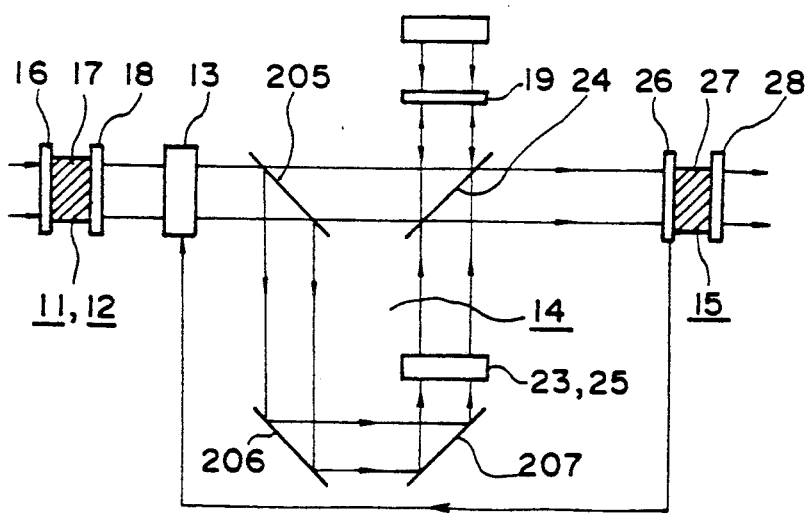
FIG.19 is a block diagram showing a third embodiment of the parallel optical processing system of the present invention.

FIG.19 shows a third embodiment of the parallel optical image processing system of the present invention. Similarly to FIG.18, these parts constructed identically to those corresponding parts in the previous drawings are given identical reference numerals and the description thereof will be omitted.

In this embodiment, one of the phase conjugate mirrors 23 is constructed to have a threshold detection function. In other words, the mirror 23 also acts as the threshold device 25. The feedback is carried out from the photodetector array 26 to the interconnection device 13 electrically or optically. In this system, one of the output beams of the interconnection device 13 which is deflected by the device 13 is passed through the memory 19 provided in the phase conjugate mirror 23 via the mirrors 205, 206 and 207 while the other output beam carrying the coded input image is directly incident to the photodetector array 26. By changing the deflection angle by the interconnection device 13, the first output beam addresses a desired part of the memory 19 and reads out the associated image. As the separation of the associated image and the input image using diffraction grating as in the case of the first and second embodiments is not necessary in this embodiment, the spatial modulator such as the device 21 can be omitted.

Figure 20:
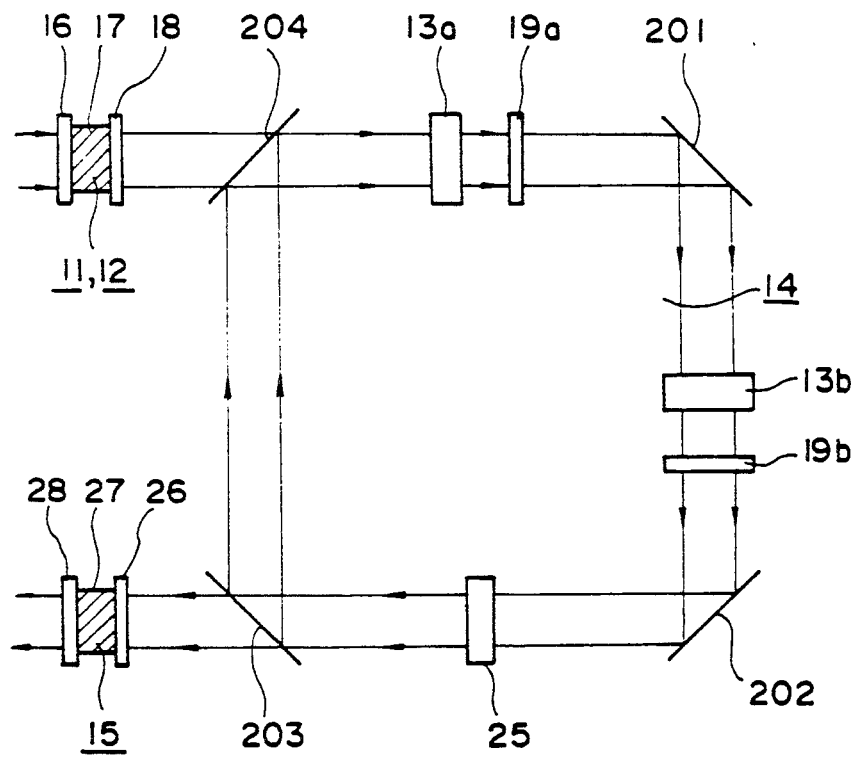
FIG.20 is a block diagram showing a fourth embodiment of the parallel optical processing system of the present invention.

Next, a fourth embodiment of the parallel optical image processing system of the present invention will be described with reference to FIG.20. In the drawing, these parts constructed identically to those corresponding parts in the preceding drawings are given identical reference numerals and the description thereof will be omitted.

In this embodiment, the optical path for the feedback processing part 14 is constructed in a form of Mach-Zehnder type in which the coded input image exited from the laser diode array 18 is directed to a first interconnection device 13a which, in connection with a first memory 19a having a similar mask construction as the memory 19, selects the feature of image forming the basis of association. The output beam exited from the first memory 19a thus carrying a coded image of the selected feature is then supplied to a second interconnection device 13b which directs the beam to a selected address of the memory 19b. Responsive thereto, an output beam carrying an associated image is exited from the memory 19b and is passed through the threshold device 25 which selectively passes the image having an intensity exceeding a predetermined threshold level. The image passed through the threshold device 25 is on the one hand supplied to the photodetector array 26 of the decoding part and at the same time returned to the first interconnection device 13a by the half-mirrors 203 and 204. Thus, the processing is repeated until a stable image is obtained at the photodetector array 26.

In the third and fourth embodiment, the threshold device 25 only works as an optical device having a non-linear input/output characteristic for passing the optical beam only when it has exceeded a predetermined threshold level. Thus, when the device 25 is used in such embodiments, the controller 255, ROM 256 and the RAM 257 may be omitted.

Further, the present invention is not limited to these embodiments but various variations and modifications may be made without departing from the scope of the invention.

What is claimed is:

1. A parallel optical image processing system, comprising:
    a) image detection means for detecting an input image;
    b) encoding means, supplied with an electrical image signal from said image detection means, for producing an encoded input image in the form of an optical beam carrying a two-dimensional luminescent pattern corresponding to the encoded input image, said two-dimensional luminescent pattern including a two-dimensional distribution of luminosity representing the input image when viewed in a direction of propagation of the optical beam;
    c) optical memory means storing a number of encoded images of objects in the form of a two-dimensional transparent pattern;
    d) optical interconnection means, supplied with said encoded input image, for addressing said optical memory means by deflecting the optical beam so as to read out one of the images stored in the optical memory means as an associated image, said associated image including a second optical beam having a second two-dimensional luminescent pattern when viewed in a propagating direction thereof;
    e) first optical path means supplied with said encoded input image;
    f) second optical path means supplied with the associated image;
    g) decoding means, supplied with an encoded output image including a superposed image, the superposed image including a superposition of:
        (1) the encoded input image, and
        (2) the associated image from said respective first nd second optical path means; the decoding means for decoding the encoded output image to form a decoded output image; and
    h) feedback control means for controlling the addressing of the memory means by the optical interconnection means responsive to the encoded output image.

2. A system as claimed in claim 1 in which said feedback control means comprises a photodetector array provided so as to receive the encoded output image from the first and second optical path means for producing an electrical control signal as a function of intensity of said encoded output image.

3. A system as claimed in claim 2 in which said photodetector array is coupled with a laser diode array for producing the encoded output image.

4. A system as claimed in claim 2 in which said photodetector array forms a part of said decoding means.

5. A system as claimed in claim 1 in which said feedback control means comprises a first half-mirror provided so as to divert the encoded input image and the associated image incident to the decoding means from said first and second optical paths as a feedback image, a second half-mirror provided between the encoding means and the optical interconnection means, and a third optical path means for passing the feedback image from said first half-mirror to the second half-mirror, said third optical path means comprises an optical threshold means for passing a part of the feedback image having an intensity exceeding a predetermined threshold level.

6. A system as claimed in claim 1, wherein the second optical path means includes:
an optical threshold means for passing an image incident to the optical threshold means is an intensity of a part of the image incident to the optical threshold means exceeds a predetermined threshold level.

7. A system as claimed in claim 1 in which either one of said first optical path means and second optical path means has a phase conjugate mirror for correcting phase of an optical beam reflected back and forth in said phase conjugate mirror.

8. A system as claimed in claim 1 in which branching of said first optical path means from said second optical path means is made by a diffraction grating for diffracting the encoded input image and the associated image to said first optical means as a diffracted image.

9. A system as claimed in claim 1 in which said encoding means comprises edge detection means supplied with the electrical image signal from the image detection means for producing an edge signal corresponding to an edge image of the input image, slope detection means, curvature detection means and line connection pattern detection means respectively supplied with the edge signal from the edge detection means for producing a slope detection signal indicating slope of the input image, a curvature detection signal indicating curvature of the input image and a line connection pattern detection signal indicating pattern of line connection respectively, reconstruction means supplied with the slope detection signal, the curvature detection signal and the line connection pattern signal for producing an encoded image signal, and a laser diode array comprising a plurality of laser diodes arranged in a row and column formation, said laser diode array being supplied with the encoded image signal from said reconstruction means for producing said optical beam with the luminescent pattern representing the encoded input image.

10. A system as claimed in claim 9 in which said edge detection means supplies the edge signal to the reconstruction means as a size signal indicating size of the input image, and said image detection means produces a color signal indicating color of the input image and supplies the color signal to the reconstruction means.

11. A system as claimed in claim 10 in which said encoded input image represents number of objects in the input image, size of the object, form of the object and color of the object.

12. A system as claimed in claim 1 in which said optical memory means comprises a mask defined with a plurality of windows arranged in row and column formation, and each window carries a mask pattern corresponding to encoded image of object which differs in each window.

13. A system as claimed in claim 1, wherein said optical interconnection device includes:
an acousto-optic device driven by an oscillator, the oscillator having an oscillation frequency, said oscillator changing its oscillation frequency under control of the feedback control means.

14. A system as claimed in claim 13 in which said oscillator is controlled by a memory device on the basis of a content of the memory device, and said feedback control means updates the content of the memory device.

15. A system as claimed in claim 13, wherein:
said acousto-optic device is coupled with an electro-optic device controlled by a second memory device on the basis of content of the second memory device; and
said feedback control means updates the content of the second memory device.

* * * * *